(12) United States Patent
Hulbert

(10) Patent No.: US 6,421,331 B1
(45) Date of Patent: Jul. 16, 2002

(54) POWER CONTROL AND RATE INFORMATION METHOD FOR A MOBILE RADIO COMMUNICATION SYSTEM

(75) Inventor: Anthony Peter Hulbert, Southampton (GB)

(73) Assignee: Roke Manor Research Limited, Hampshire (GB)

( * ) Notice: Subject to any disclaimer, the term of this patent is extended or adjusted under 35 U.S.C. 154(b) by 0 days.

(21) Appl. No.: 09/302,485

(22) Filed: Apr. 30, 1999

(30) Foreign Application Priority Data

Apr. 30, 1998 (GB) ............................... 9809145

(51) Int. Cl.[7] .............................................. H04J 13/00
(52) U.S. Cl. ....................................... 370/335; 370/318
(58) Field of Search ................................. 370/465, 395, 370/479, 252, 253, 310, 328, 329, 335, 351, 342, 441, 442, 389, 333, 318; 455/522

(56) References Cited

U.S. PATENT DOCUMENTS

| | | | |
|---|---|---|---|
| 5,465,399 A | | 11/1995 | Oberholtzer |
| 5,528,593 A | | 6/1996 | English |
| 5,537,410 A | * | 7/1996 | Li ................................ 370/465 |
| 6,141,353 A | * | 10/2000 | Li ................................ 370/465 |

FOREIGN PATENT DOCUMENTS

| | | |
|---|---|---|
| WO | 9602097 | 1/1996 |
| WO | 9621998 | 7/1996 |
| WO | WO 97/00562 | 1/1997 |
| WO | WO 97/02668 | 1/1997 |

\* cited by examiner

*Primary Examiner*—Douglas Olms
*Assistant Examiner*—Ken Vanderpuye
(74) *Attorney, Agent, or Firm*—Crowell & Moring LLP

(57) ABSTRACT

The method of operating an uplink of a CDMA mobile telecommunications system provides optimization of power control accuracy, or rate change responsiveness for at least one communications a channel. Rate information is provided which indicates (a) the rate of the current frame, or (b) which indicates the power of a subsequent frame. Selection between (a) and (b) is possible by transmitting global information to all terminals in a cell, or by instructing individual terminals by use of a bit within the rate information bits carried within each slot of a control channel.

4 Claims, 1 Drawing Sheet

RI IF, n-1th FRAME APPLIES ALSO IN n AND N+1th FRAMES

QI IF n-1th FRAME APPLIES AS EXPECTED IN nth FRAME. THE RI BITS IN THE n+1 FRAME WILL DETERMINE ITS RATE.

POWER CONTROL AND RATE INFORMATION METHOD FOR A MOBILE RADIO COMMUNICATION SYSTEM

BACKGROUND OF THE INVENTION

The present invention relates to a method for providing power control and rate information in a mobile radio communication system, and in particular, the method is suitable for use in the UMTS Terrestrial Radio Access (UTRA) system where UMTS stands for Universal Mobile Telecommunication System. In the UTRA system a variety of different services are provided where a service can be characterised by a combination of transmission rate and bit reliability. Therefore, there is a requirement for radio links between the mobile terminal and the base station to be able to carry one or more different services contemporaneously. From time to time it may be necessary to alter the service mix passing over the channel and this alteration in service mix can lead to a change in the required transmission rate, and therefore the capability of altering the transmission rate is provided.

The UTRA system is based upon spread spectrum Code Division Multiple Access (CDMA) technology. There are two mechanisms employed for altering the bit rate, the first is to alter the spreading factor applied to a code that is transmitted over the radio channel, the second degree of freedom is to alter the number of codes which are added together prior to transmission. For a given multiplex the current rate of transmission needs to be communicated from the mobile station to the base station when considering the uplink.

SUMMARY OF THE INVENTION

An aim of the present invention is to provide a method of power control and rate information signalling in a mobile communications system.

According to the present invention there is provided a method of operating an uplink of a CDMA mobile telecommunications system, comprising the steps of:

communicating transmission rate information from a mobile station to a base station by transmitting rate information data in a frame for either the frame in which said rate information data was transmitted (Mode A), or for a subsequent frame (Mode B), optimising performance by switching between Modes A and B, with respect to Mode A, arranging for the base station to measure a received signal to interference ratio (SIR) independently of the transmission rate of the data, with respect to Mode B, arranging for the base station to measure the SIR in dependence upon the information rate of the received data, and, using the measured SIR to effect control of the transmission power of the mobile station.

According to an aspect of the present invention, a signal amenable to measurement of its SIR independently of the rate information for that frame is transmitted using a specific spread spectrum code, and applied either to an inphase or quadrature channel within its transmit signal generation path in the mobile station prior to the application of any further processing in said path.

According to a further aspect of the present invention, the mode selection is made by transmitting to all terminals operating in a cell, information on a control channel which states the mode of operation.

BRIEF DESCRIPTION OF THE DRAWINGS

An embodiment of the present invention will now be described with reference to the accompanying drawings, wherein.

DETAILED DESCRIPTION OF THE INVENTION

The present invention provides a method based on the transmission of rate information (RI bits) which are distributed across the period of the transmission. The transmission is divided into ten millisecond frames and the unit of granularity for altering the bit rate is one of these ten millisecond frames so the bit rate can take one value in the current ten millisecond frame and a different value in a subsequent ten millisecond frame. There are two options as to how the rate information for a frame might be encoded as to the significance of these rate information bits. Either the rate information bits provide the transmission rate and quality for the current frame, that is, the frame in which they are transmitted or they provide the rate information for a subsequent frame. These two approaches have different advantages and disadvantages.

It should also be understood that because the present invention is based upon Code Division Multiple Access, the operation of automatic transmitter power control is a key feature of the system concept and it is a requirement that the power be controlled in a rapid accurate fashion. This is done for controlling the uplink by arranging for the base station to make periodic measurements of the signal to interference ratio (SIR) of the received signal and this is done at regular intervals. In the preferred embodiment sixteen such intervals known as slots are used within every ten millisecond frame.

In response to each measurement on each of the sixteen slots, the base station transmits bits towards to mobile transceiver, one state of a bit indicating that the power of the mobile station needs to be increased, the other state indicating that the power of the mobile station needs to be reduced. Because the measurements performed in the base station are against a signal to interference ratio of received symbols, it is a requirement that the symbols be demodulated in the base station receiver before such measurements can be made. However, it is not possible to determine the period over which to demodulate or 'de-spread' the symbols until the rate information for that frame becomes known. If the rate information in a given frame is related to the current frame, this information is unavailable until the entire frame has been received. In this event, it is not possible on the basis of the transmitted information to obtain meaningful power control measurements and therefore to implement an effective power control loop. On the other hand, when the rate information applies to the subsequent frame, then that information is available in time to make the necessary measurements.

Figure 1:
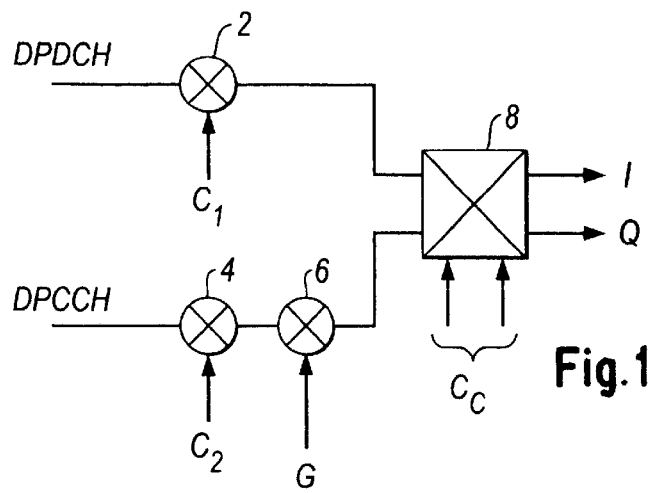
FIG. 1 shows a block diagram of part of a transmission path in a communications system for performing the present invention.

The present invention provides for the multiplexing onto the inphase and the quadrature channels, two further types of channels, namely the dedicated physical data channel (DPDCH) and the dedicated physical control channel (DPCCH). The DPDCH will be on the I (inphase) channel and the DPCCH will be on the Q (quadrature) channel or vice versa, and if more than one DPDCH is required then they will be distributed uniformly over the I and the Q channels, as shown in FIGS. 1 and 2.

The information on the DPDCH and DPCCH is in bipolar form on the respective I and Q channels, and is spread by a spreading code $C_1$ and $C_2$ applied in bipolar form to the multipliers 2, 4. A gain control signal G is applied to the output of the multiplier 4 via a multiplier 6, in the DPCCH channel to adjust the level of that channel relative to the DPDCH. The output signals from the multipliers 2, 6 are applied to complex circuit 8, and operated on by a complex bipolar code $C_c$ and provides the I and Q output signals.

Figure 2A:
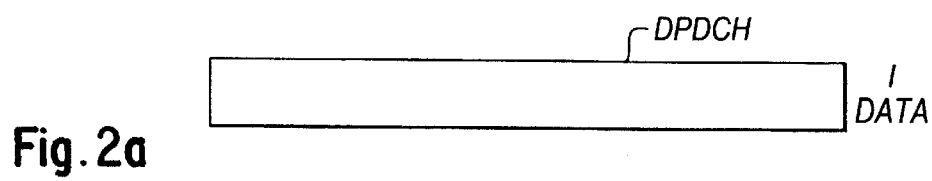
FIG. 2 shows the data and control channel formats.
Figure 2B:
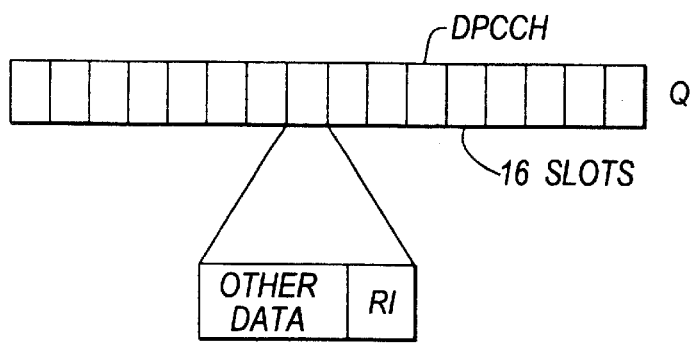

Referring to FIG. 2, the DPDCH channel is shown on the I channel, and the DPCCH is shown on the Q channel. This channel has sixteen slots and each slot includes various data bit plus rate information bits RI.

The rate of the DPCCH is constant, it is possible therefore to perform measurements on the DPCCH without the need to demodulate the rate information bits first. However, the DPCCH is a low power transmission and therefore the accuracy that is available in the measurements made on it is relatively poor. When the mobile transmitter sets up its transmissions, it arranges for the ratio of the power in the DPCCH to the DPDCH to be set in accordance with the relative powers required for the different bit rates on the channels. Thus by making power control measurements to set the correct power level or the correct SIR for the DPCCH, it should arise that the correct power also therefore applies for the DPDCH. However, because of the aforesaid power control inaccuracies, it would be better if the power could be set on the basis of the DPDCH.

The present invention makes both options available, that is, it provides a method which can operate either in a mode where the rate information indicates the rate of the current frame (Mode A), or the rate information indicates the power of a subsequent frame (Mode B). For the case where the rate information bits indicate the power for the subsequent frame, the base station is allowed to use this information to make power control measurements on the basis of the DPDCH thereby resulting in improved accuracy of power control measurements. In the case where the rate information applies to the current frame it will then be necessary to use the DPCCH to establish the power control measurements. Thus, the fullest possible flexibility is achieved and a method is provided whereby the rate can be altered on a frame by frame basis, making as it were last minute decisions, but where the power control and therefore the capacity is not as good as might be possible or alternatively a slightly less responsive method is provided where the rate changes cannot be made so rapidly but where the capacity is maximized. When a cell is full loaded a maximized, capacity is very important and therefore it would be appropriate to arrange for the power control to be as accurate as possible and perhaps the signalling of rate changes to be less responsive. On the other hand for a lightly loaded cell there is nothing to be lost from having the rapid rate changes.

The exact mode of signalling the change could take one of a number of forms, for example, the broadcast channel (BCCH) of the base station could carry information relevant to all terminals operating within the cell serviced by that base station, stating that the mode of operation for all terminals operating in that cell henceforth will change either from rate information being transmitted on the current frame or rate information being carried on the subsequent frame or vice-versa.

Figure 3A:
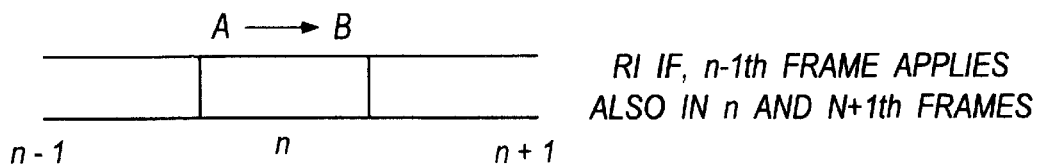
FIG. 3 shows control mode changes.
Figure 3B:
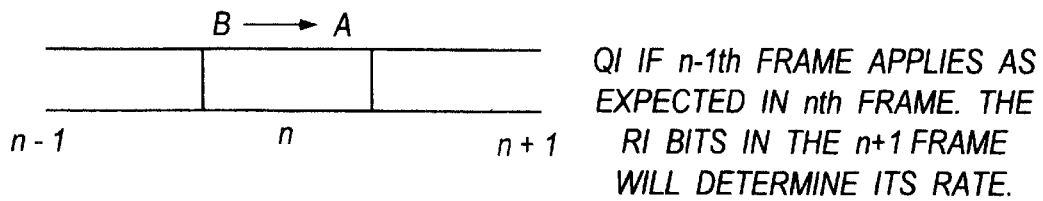

Changes in Mode A to B and B to A are shown in FIG. 3 for a more flexible arrangement whereby the information can be varied on a terminal by terminal basis. This would be possible by for example including or exploiting a single bit within the rate information bits which indicates whether the current bits now apply to the current frame or whether they will apply to the subsequent frame. The single bit could be an additional bit or an existing bit re-used to convey the required mode. Thus, the change of the meaning of the rate information could either be made on a frame by frame basis or the data could be arranged to provide a switch from one mode to the other on demand. The data required to do this could be reduced by providing just a known value of the rate information pattern. In this case it would be assumed that the rate information of the previous frame continued to apply, thus the amount of data required to communicate this information could be very small.

Alternatively, two patterns of RI bits could be used to indicate a change of mode. Where such a pattern is used, the previous rate is assumed to be continued with.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of operating an uplink of a CDMA mobile telecommunications system, comprising the steps of:

communicating transmission rate information from a mobile station to a base station by transmitting rate information data in a frame for either the frame in which said rate information data was transmitted, Mode A), or for a subsequent frame, Mode B optimizing performance by switching between Modes A and B, with respect to Mode A, arranging for the base station to measure a received signal to interference ratio (SIR) independently of the transmission rate of the data, with respect to Mode B, arranging for the base station to measure the SIR in dependence upon the information rate of the received data, and, using the measured SIR to effect control of the transmission power of the mobile station.

2. A method as claimed in claim 1, where a signal amenable to measurement of its SIR independently of the rate information for that frame is transmitted using a specific spread spectrum code, and applied either to an inphase or quadrature channel within the transmit signal generation path in the mobile station prior to the application of any further processing in said path.

3. A method as claimed in claim 1, wherein the mode selection is made by transmitting to all terminals operating in a cell, information on a control channel which states the mode of operation.

4. A method as claimed in claim 1, wherein each terminal in a cell is instructed on the mode of operation by providing a bit within rate information bits carried in each slot of a control channel to indicate whether the current bits apply to a current frame or to a subsequent frame.

* * * * *